US012588579B2

(12) United States Patent
Hastings et al.

(10) Patent No.: US 12,588,579 B2
(45) Date of Patent: Mar. 31, 2026

(54) UNIVERSAL JOINT SHAFT

(71) Applicant: Walterscheid GmbH, Lohmar (DE)

(72) Inventors: Jesse Hastings, Davis, IL (US); Chris Evers, Dresden (DE); Falk Hantschack, Dresden (DE)

(73) Assignee: Walterscheid GmbH, Lohmar (DE)

( * ) Notice: Subject to any disclaimer, the term of this patent is extended or adjusted under 35 U.S.C. 154(b) by 219 days.

(21) Appl. No.: 18/449,816

(22) Filed: Aug. 15, 2023

(65) Prior Publication Data

US 2024/0090360 A1 Mar. 21, 2024

(30) Foreign Application Priority Data

Sep. 21, 2022 (EP) .................................... 22196883

(51) Int. Cl.
H02K 7/00 (2006.01)
A01B 71/06 (2006.01)
(Continued)

(52) U.S. Cl.
CPC .............. A01B 71/06 (2013.01); B60K 25/06 (2013.01); F16C 3/03 (2013.01); F16D 3/32 (2013.01);
(Continued)

(58) Field of Classification Search
CPC ........ H02K 7/003; H02K 7/116; A01B 71/06; B60K 25/06; F16C 3/03; F16D 3/841
See application file for complete search history.

(56) References Cited

U.S. PATENT DOCUMENTS

2004/0150228 A1 8/2004 Kropp et al.
2014/0117676 A1 5/2014 Goetz et al.
(Continued)

FOREIGN PATENT DOCUMENTS

DE 4327533 C1 * 1/1995 ........... F16H 57/025
DE 10303050 A1 8/2004
GB 2405129 A 2/2005

OTHER PUBLICATIONS

EPO Extended European Search Report for application No. EP22196883 mailed Feb. 10, 2023 (14 pages; with English machine translation).

*Primary Examiner* — Terrance L Kenerly
(74) *Attorney, Agent, or Firm* — Brooks Kushman P.C.

(57) ABSTRACT

A universal joint shaft can be provided for transmitting torque between a power take-off shaft of a driving agricultural machine and a drive journal of an agricultural implement to be driven. The universal joint shaft comprises a first joint with a first inner joint member and a first outer joint member, which are pivotably and torque-transmittingly connected to each other, a second joint, with a second inner joint member and a second outer joint member, which are pivotably and torque-transmittingly connected to each other, a connecting shaft, via which the first inner joint member and the second inner joint member are connected to each other in a rotationally fixed manner, and a connecting hub which is rigidly connected to the first outer joint member and has connecting means for connecting the connecting hub to a shaft in a rotationally fixed manner, a housing in which the connecting hub is accommodated and rotatably mounted, and a generator accommodated in the housing, said generator has a stator rigidly connected to the housing and arranged coaxially to the connecting hub, and said generator further has a rotor rotatably mounted relative
(Continued)

to the housing, wherein the rotor is drivingly connected to the connecting hub via a transmission.

15 Claims, 4 Drawing Sheets

(51) Int. Cl.
    *B60K 25/06*            (2006.01)
    *F16C 3/03*             (2006.01)
    *F16D 3/32*             (2006.01)
    *F16D 3/84*             (2006.01)
    *H02K 7/116*           (2006.01)
(52) U.S. Cl.
    CPC ............. *F16D 3/841* (2013.01); *H02K 7/003* (2013.01); *H02K 7/116* (2013.01)

(56) References Cited

U.S. PATENT DOCUMENTS

| | | | |
|---|---|---|---|
| 2018/0219447 A1* | 8/2018 | Kim ......................... | B25J 9/102 |
| 2022/0252438 A1* | 8/2022 | Bondioli ................... | F16D 3/41 |

* cited by examiner

UNIVERSAL JOINT SHAFT

CROSS-REFERENCE TO RELATED APPLICATIONS

This application is a national stage of, and claims priority to, European Patent Application No. EP22196883.7, filed on Sep. 21, 2022, which application is hereby incorporated herein by reference in its entirety.

BACKGROUND

DE 103 03 050 A1 discloses a universal joint shaft for driving working units via a power take-off shaft of an agricultural machine. On the agricultural machine, for example a tractor, a generator unit is arranged between the universal joint shaft and the power take-off shaft, via which a generator is driven by the power take-off shaft, the mechanical power of the power take-off shaft being transmitted to the universal joint shaft via an output shaft of the generator unit. This means that any tractor with a power take-off shaft can be retrofitted or extended, for example, to provide an additional on-board power supply with a higher voltage.

SUMMARY

The present disclosure generally relates to a universal joint shaft for transmitting torque between a power take-off shaft of a driving agricultural machine and a drive journal of an agricultural implement to be driven. An aspect of the present disclosure is to provide a compact arrangement for generating electrical power by means of a universal joint shaft.

According to this aspect a universal joint shaft for transmitting torque between a power take-off shaft of a driving agricultural machine and a drive journal of an agricultural implement to be driven, wherein the universal joint shaft comprises a first joint, a second joint, a connecting shaft and a connecting hub. The first joint has a first inner joint member and a first outer joint member that are pivotably and torque-transmittingly connected to each other. The second joint has a second inner joint member and a second outer joint member that are also pivotably and torque-transmittingly connected to each other. The first inner joint member and the second inner joint member are connected to each other in a rotationally fixed manner via the connecting shaft. The connecting hub is rigidly connected to the first outer joint member and has connecting means for connecting the connecting hub to a shaft in a rotationally fixed manner. The universal joint shaft further comprises a housing in which the connecting hub is accommodated and rotatably mounted. A generator is accommodated in said housing and has a stator rigidly connected to the housing and arranged coaxially to the connecting hub, and has a rotor rotatably mounted relative to the housing, wherein the rotor is drivingly connected to the connecting hub via a transmission.

The integration of the generator into the universal joint shaft results in a compact arrangement with a small installation space. Furthermore, the generator does not interrupt the mechanical power and torque transmission of the universal joint shaft.

The transmission can be a planetary gear. Here, a ring gear of the planetary gear can be connected to the housing, a sun gear of the planetary gear can be connected to the rotor, and a planet carrier of the planetary gear can be connected to the connecting hub in a rotationally fixed manner, with the planet carrier carrying planet gears that are each in toothed engagement with the ring gear and the sun gear. This increases the speed of the connecting hub to the sun gear, which is drivingly connected to the rotor, e.g. in a rotationally fixed manner.

In one embodiment, the housing has at least one torque support by means of which the housing can be supported in a rotationally fixed manner against a component stationary relative to the connection hub, for example an agricultural machine or an agricultural implement.

The housing may house power electronics for converting and controlling the electrical energy generated by the generator. This results in a very compact design of the universal joint shaft including generator and power electronics.

In addition, a connector receptacle for connecting an electrical cable may be arranged on the housing.

The compact design of the universal joint shaft can be complemented by the generator and/or power electronics being air-cooled via the housing.

In one embodiment, the first joint can be a cardan joint having a first outer joint yoke as the first outer joint member and a first inner joint yoke, connected to the first outer joint yoke by means of at least one journal cross, as the first inner joint member.

Furthermore, the second joint can be a cardan joint having a second outer joint yoke as the second outer joint member and a second inner joint yoke, connected to the second outer joint fork by means of at least one journal cross, as the second inner joint member.

In principle, other types of joints, such as constant velocity joints, are also possible.

The connecting shaft can have at least a first telescopic element and a second telescopic element, which are connected to each other in an axially displaceable and torque-transmitting manner. In principle, however, more than two telescope elements are also possible.

In addition, the universal joint shaft may include a universal joint shaft guard in which the first joint, the second joint, and the connecting shaft are rotatably received, wherein the universal joint shaft guard is coupled to the housing in a rotationally fixed manner or forms the housing.

BRIEF SUMMARY OF THE DRAWINGS

An exemplary embodiment of the universal joint shaft is explained in more detail below with reference to the drawings.

DESCRIPTION WITH REFERENCE TO THE DRAWINGS

Figure 1:
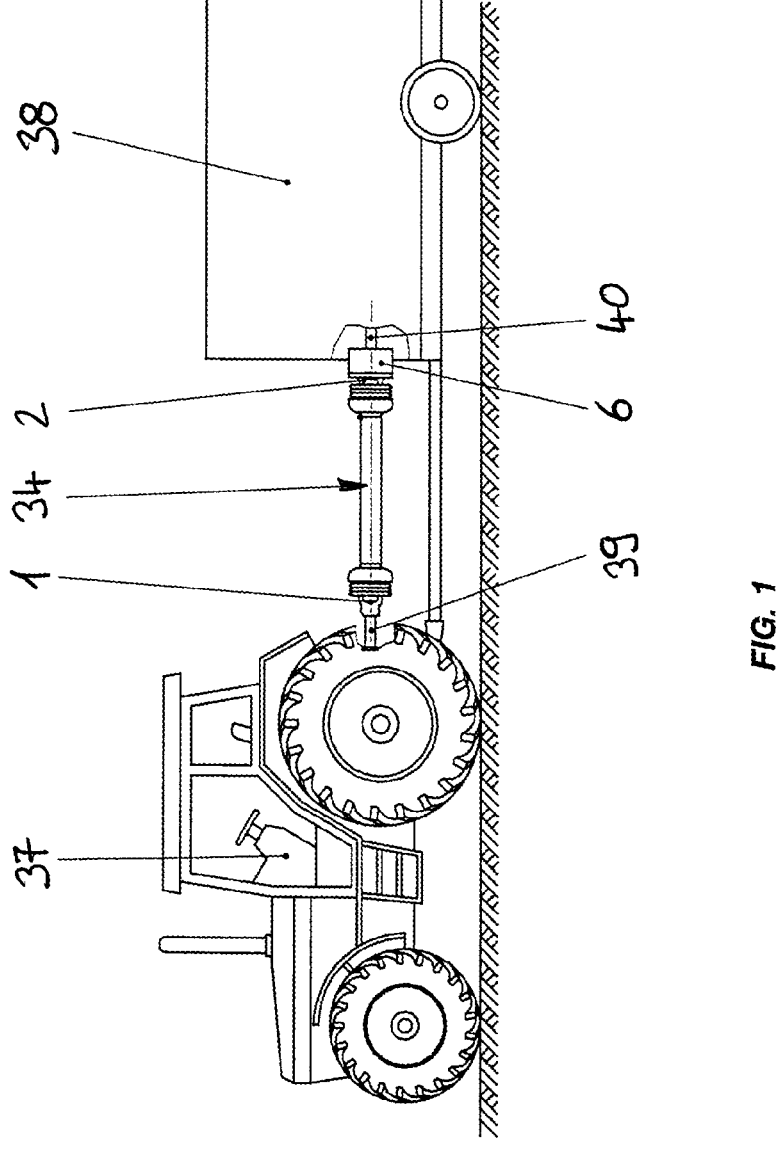
FIG. 1 shows a tractor with an implement attached to it, which is driven by a universal joint shaft and provided with a universal joint shaft guard.

FIG. 1 shows an agricultural machine, in this case a tractor 37, with an agricultural implement 38 attached and driven by the tractor 37. The implement 2 is driven by a power take-off shaft 39 of the tractor 37 by means of a universal joint shaft 34. For this purpose, a first joint 1 of the universal joint shaft 34 is attached to the power take-off shaft 39. A second joint 2, mounted at another end, is drivingly connected to a drive journal 40 of the agricultural implement 38. To generate electrical energy through the rotation of the universal joint shaft 34, the universal joint shaft 34 has a generator 6.

Figure 2:
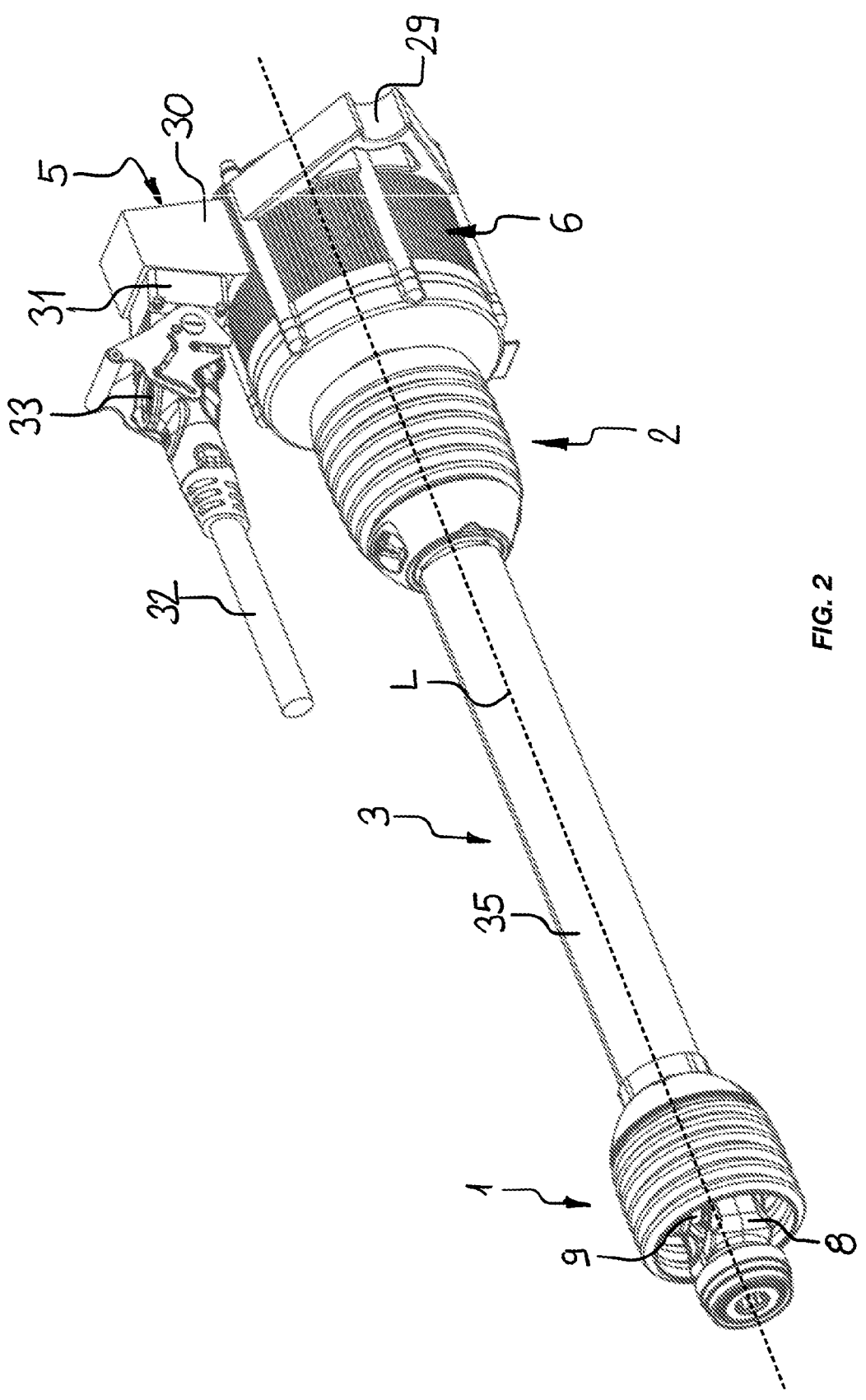
FIG. 2 shows a perspective view of the universal joint shaft according to FIG. 1.
Figure 3:
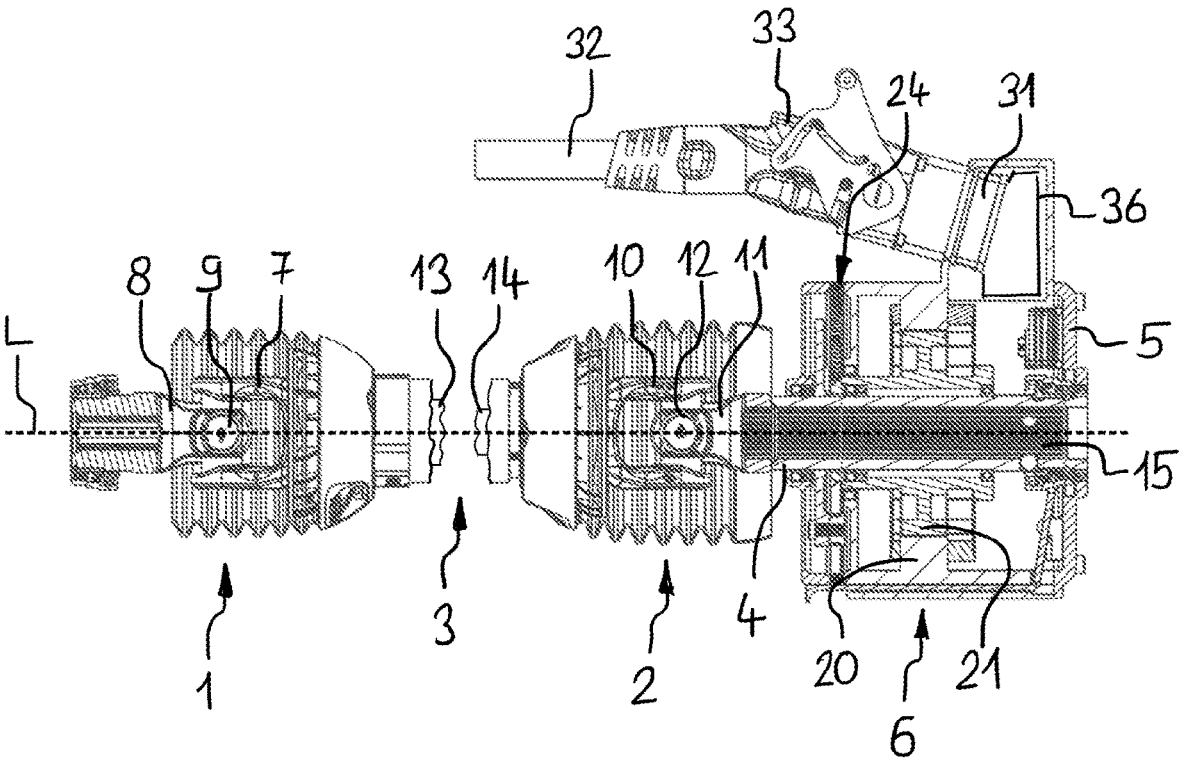
FIG. 3 shows a longitudinal section of the universal joint shaft according to FIG. 1.
Figure 4:
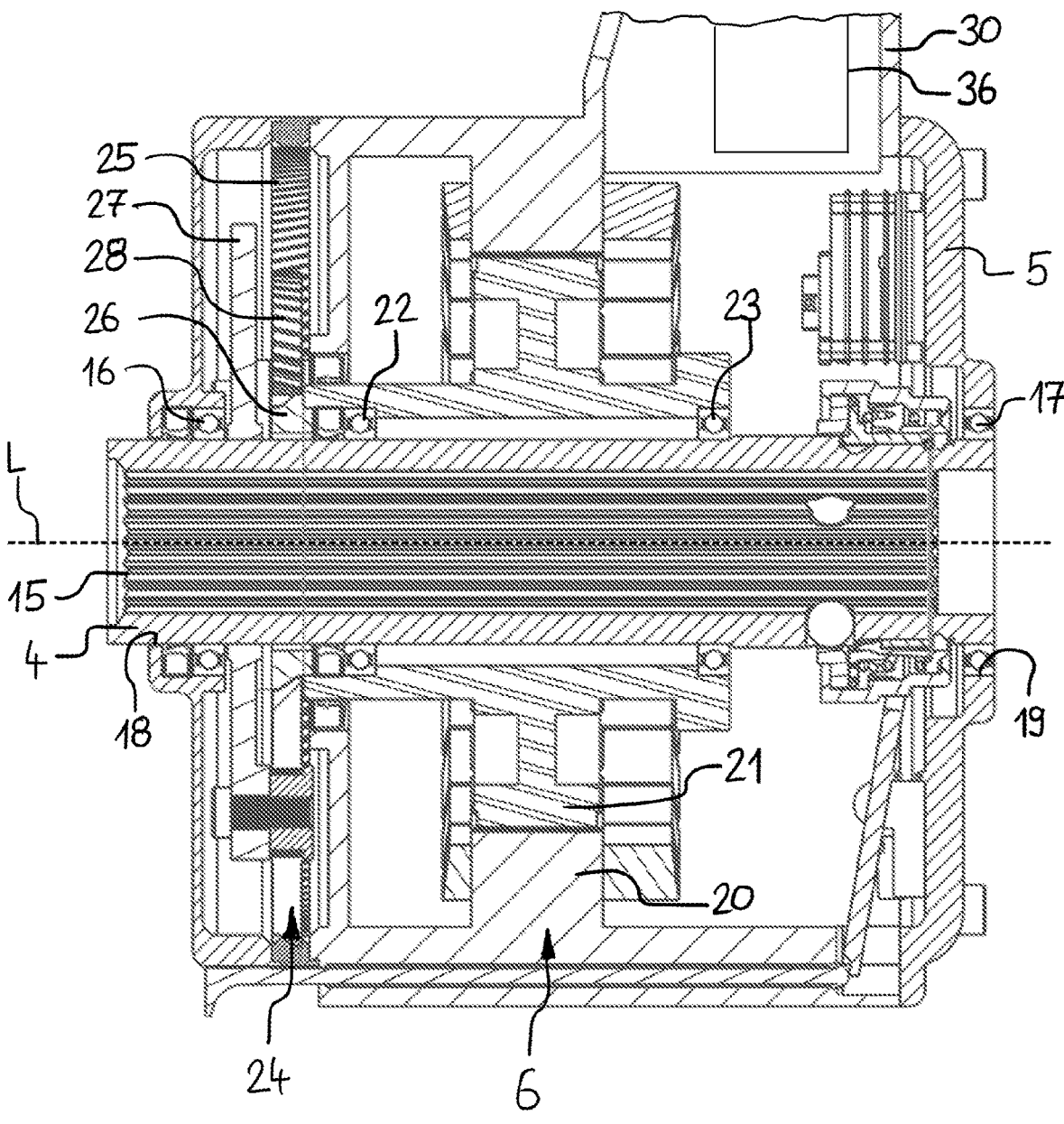
FIG. 4 shows an enlarged view of the longitudinal section according to FIG. 3 in the area of the generator.

FIGS. 2 to 4 show the universal joint shaft 34 as shown in FIG. 1 in various representations and are described together below.

The universal joint shaft 34 comprises the first joint 1 and the second joint 2, which are connected to each other via a connecting shaft 3. The universal joint shaft 34 further comprises a connecting hub 4, which is received in a housing 5. The generator 6 is further accommodated in the housing 5.

The first joint 1 has a first inner joint member 7 in the form of a joint yoke and a first outer joint member 8 in the form of a joint yoke, which are pivotably and torque-transmittingly connected to each other via a journal cross 9.

The second joint 2 has a second inner joint member 10 in the form of a joint yoke and a second outer joint member 11 in the form of a joint yoke, which are connected to one another in a pivotable and torque-transmitting manner via a journal cross 12.

In principle, the first joint 1 and/or the second joint 2 can be designed differently as long as they are designed pivotably and torque-transmittingly, such as a constant velocity joint.

The first inner joint member 7 and the second inner joint member 10 are connected to each other by means of the connecting shaft 3 in a rotationally fixed respectively torque-transmitting manner. In the present embodiment, the connecting shaft 3 is a telescopic shaft with a first telescopic element 13 and a second telescopic element 14, which are connected to each other in an axially displaceable and torque-transmitting manner.

The connecting shaft 3 could alternatively or additionally be rigid or composed of more than two telescopic elements.

The connecting hub 4 is connected to the second outer joint member 11 in a rotationally fixed manner and is a hollow shaft with connecting means 15 in the form of internal splines, with which the connecting hub 4 can be pushed onto the connecting pin 40 with external splines.

The connecting hub 4 is mounted in the housing 5 via rolling bearings 16, 17. In principle, other rotary bearings, such as plain bearings, can also be used. The connecting hub 4 extends through the entire housing 5 and protrudes from a first opening 18 facing the second joint 2. On a side facing away from the first opening 18, the connecting hub 4 is accessible through a second opening 19 of the housing 5 and can be pushed onto the shaft, for example a power take-off shaft.

A stator 20 of the generator 6 is located in the housing 5, the stator 20 being rigidly, i.e., in a rotationally fixed manner, connected to the housing 5. The stator 20 is arranged coaxially to a longitudinal axis L of the connecting hub 4. Furthermore, a rotor 21 of the generator 6 is rotatably arranged in the housing 5, the rotor 21 being arranged coaxially with the stator 20. In the embodiment shown, the rotor 21 is mounted on the connecting hub 4 via rolling bearings 22, 23. Other rotary bearings, such as plain bearings, can also be used instead of the rolling bearings 22, 23. In addition, the rotor 21 can also be mounted directly in the housing 5.

The rotor 21 is also drivingly connected to the connecting hub 4. In the present embodiment, the rotor 21 is drivingly connected to the connecting hub 4 via a planetary gear 24. In principle, any other type of transmission can be used to translate the speed of the connecting hub 4 to faster speed.

In the present case, with the transmission being a planetary gear 24, in the embodiment example shown, a ring gear 25 of the planetary gear 24 in the housing 5 is connected thereto in a rotationally fixed manner. A sun gear 26 of the planetary gear 24 is non-rotatably connected, i.e. in a rotationally fixed manner, to the rotor 21. A planet carrier 27 of the planetary gear 24 carries a plurality of planet gears 28 rotatable relative to the planet carrier 27, each of which is in toothed engagement on the one hand with teeth of the ring gear 25 and on the other hand with teeth of the sun gear 26.

To prevent the housing 5 from rotating when the connecting hub 4 is driven, the housing 5 has a torque support 29 in the form of a concave recess which can be supported against a fixed and stationary, appropriately shaped projection or journal in the direction about the longitudinal axis L. This protrusion or pivot can be located, for example, on an agricultural machine or implement.

The housing 5 has a housing section 30 that houses power electronics 36 (shown schematically here) for converting and controlling the electrical power generated by the generator 6. Furthermore, a connector receptacle 31 is arranged on the housing 5 to connect the power electronics 36 to an on-board power supply. An electrical cable 32 with connector 33 may be provided for this purpose, as shown.

The universal joint shaft 34 further comprises a universal joint shaft guard 35 in which the rotating components of the universal joint shaft 34 that are not arranged in the housing 5 are accommodated, the universal joint shaft guard 35 being coupled to the housing 5 in a rotationally fixed manner.

LIST OF REFERENCE NUMBERS

1 First joint
2 Second joint
3 Connecting shaft
4 Connecting hub
5 Housing
6 Generator
7 First inner joint member
8 First outer joint member
9 Journal cross
10 Second inner joint member
11 Second outer joint member
12 Journal cross
13 First telescopic element
14 Second telescopic element
15 Connecting means
16 Rolling bearing
17 Rolling bearing
18 First opening
19 Second opening
20 Stator
21 Rotor
22 Rolling bearing
23 Rolling bearing
24 Planetary gear
25 Ring gear
26 Sun gear
27 Planet carrier
28 Planet gear
29 Torque support
30 Housing section
31 Connector receptacle
32 Cable
33 Connector
34 Universal joint shaft
35 Universal joint shaft guard 36 Power Electronics
37 Tractor
38 Implement
39 Power take-off shaft
40 Drive journal
L Longitudinal axis

The invention claimed is:

1. A universal joint shaft for transmitting torque between a power take-off shaft of a driving machine and a drive journal of an implement to be driven, the universal joint shaft comprising:
  a first joint with a first inner joint member and a first outer joint member that are pivotally and torque-transmittingly connected to each other;
  a second joint, with a second inner joint member and a second outer joint member that are pivotally and torque-transmittingly connected to each other;
  a connecting shaft, via which the first inner joint member and the second inner joint member are connected to each other in a rotationally fixed manner;
  a connecting hub which is rigidly connected to the second outer joint member and has a connector to connect the connecting hub to a shaft in a rotationally fixed manner;
  a housing in which the connecting hub is accommodated and rotatably mounted; and
  a generator accommodated in the housing and including a stator rigidly connected to the housing and arranged coaxially to the connecting hub, and further including a rotor rotatably mounted relative to the housing, wherein the rotor is drivingly connected to the connecting hub via a transmission.

2. The universal joint shaft according to claim 1, wherein the transmission is a planetary gear.

3. The universal joint shaft according to claim 2, wherein the planetary gear comprises:
  a ring gear connected to the housing in a rotationally fixed manner;
  a sun gear connected to the rotor in a rotationally fixed manner; and
  a planet carrier carrying planet gears that are in toothed engagement with the ring gear and the sun gear, the planet carrier being drivingly connected to the connecting hub.

4. The universal joint shaft according to claim 1, wherein the housing has at least one torque support, via which the housing is supportable in a rotationally fixed manner against a component that is stationary relative to the connecting hub.

5. The universal joint shaft according to claim 1, wherein power electronics for converting and controlling the electrical energy generated by the generator are accommodated in the housing.

6. The universal joint shaft according to claim 5, wherein the power electronics are air-cooled via the housing.

7. The universal joint shaft according to claim 1, wherein the generator is air-cooled via the housing.

8. The universal joint shaft according to claim 1, wherein a connector receptacle for connecting an electrical cable is arranged in the housing.

9. The universal joint shaft according to claim 1, wherein the first joint is a cardan joint having a first outer joint yoke as said first outer joint member and a first inner joint yoke as said first inner joint member connected to said first outer joint yoke by at least one journal cross.

10. The universal joint shaft according to claim 1, wherein the second joint is a cardan joint having a second outer joint yoke as said second outer joint member and a second inner joint yoke as said second inner joint member connected to said second outer joint yoke by means of at least one journal cross.

11. The universal joint shaft according to claim 1, wherein the connecting shaft has at least a first telescopic element and a second telescopic element which are connected to one another in an axially displaceable and torque-transmitting manner.

12. The universal joint shaft according to claim 1,
  wherein the universal joint shaft has a universal joint shaft guard in which the first joint, the second joint and the connecting shaft are rotatably accommodated, and
  wherein the universal joint shaft guard is coupled to the housing in a rotationally fixed manner.

13. The universal joint shaft according to claim 1, wherein the connecting hub is elongated from the second outer joint member in an opposite direction as the connecting shaft is elongated from the second inner joint member.

14. The universal joint shaft according to claim 5, wherein the housing includes a housing section extending radially outward from a remainder of the housing, and the power electronics are accommodated in the housing section.

15. The universal joint shaft according to claim 4, wherein the torque support has the form of a concave recess.

\* \* \* \* \*